United States Patent
Park

(10) Patent No.: US 7,024,985 B2
(45) Date of Patent: Apr. 11, 2006

(54) COFFEE EXTRACTING APPARATUS FOR A COFFEE MACHINE

(75) Inventor: Hae Chan Park, Kwangju (KR)

(73) Assignee: Samsung Gwangju Electronics Co., Ltd., Kwangju (KR)

( * ) Notice: Subject to any disclaimer, the term of this patent is extended or adjusted under 35 U.S.C. 154(b) by 281 days.

(21) Appl. No.: 10/444,377

(22) Filed: May 23, 2003

(65) Prior Publication Data

US 2004/0177761 A1      Sep. 16, 2004

(30) Foreign Application Priority Data

Mar. 12, 2003   (KR) ...................... 10-2003-0015549

(51) Int. Cl.
*A47J 31/34*   (2006.01)
(52) U.S. Cl. .................... 99/302 P; 99/289 R
(58) Field of Classification Search ............. 99/302 P, 99/289 R, 297, 302 R, 300
See application file for complete search history.

(56) References Cited

U.S. PATENT DOCUMENTS

| | | | |
|---|---|---|---|
| 4,579,049 A * | 4/1986 | Rodrigues ................. | 99/289 R |
| 4,681,028 A * | 7/1987 | Schmed et al. ........... | 99/289 R |
| 5,259,296 A * | 11/1993 | Mikael et al. ................ | 99/280 |
| 6,101,923 A * | 8/2000 | Karg et al. ................ | 99/289 D |
| 6,739,240 B1 * | 5/2004 | De Koning et al. .......... | 99/283 |
| 6,779,436 B1 * | 8/2004 | Guindulain Vidondo .. | 99/302 P |

* cited by examiner

*Primary Examiner*—Reginald L. Alexander
(74) *Attorney, Agent, or Firm*—Ladas & Parry LLP

(57) ABSTRACT

A coffee extracting apparatus for a coffee machine, which allows easy extraction of coffee liquid and easy removal of coffee grinds, is disclosed. The coffee extracting apparatus includes a machine case, a hopper receiving coffee grinds, a cylinder unit disposed below the hopper and rotated within a certain angle range, a upper piston movably inserted in the cylinder unit and having a hot water path therein, a lower piston inserted in the cylinder unit to press coffee grinds against the upper piston and having coffee discharge paths therein, cam and link members to guide movement of the cylinder, the upper piston and the lower piston, and a drive unit mounted on the machine case to supply driving force to the cam members. The coffee extracting apparatus is easily removed from the coffee machine. A unit amount of coffee liquid is extracted every revolution of the drive unit. Since hot water to be mixed with coffee grinds is supplied to the lower piston from the upper piston, adhesion of coffee grinds on a bottom surface of the upper piston is avoided.

16 Claims, 10 Drawing Sheets

COFFEE EXTRACTING APPARATUS FOR A COFFEE MACHINE

CROSS-REFERENCE TO RELATED APPLICATION

This application claims the benefit of Korean Application No. 2003-15549, filed Mar. 12, 2003, in the Korean Intellectual Property Office, the disclosure of which is incorporated herein by reference.

BACKGROUND OF THE INVENTION

1. Field of the Invention

The present invention relates in general to an apparatus for extracting coffee, and more particularly to a coffee extracting apparatus for use in a coffee machine, which is modularized so as to be easily mounted on and detached from the coffee machine.

2. Description of the Related Art

A coffee machine is typically provided therein with an apparatus for extracting coffee, which serves to receive coffee grinds and fresh water and to discharge final coffee beverage therefrom. Recently, the apparatus for extracting coffee is modularized to be easily mounted on and detached from the coffee machine. Accordingly, the modularized apparatus allows a user to easily access and clean interiors of the modularized apparatus and the coffee machine, and allows a user to easily detach and repair the modularized apparatus from the coffee machine when the modularized apparatus malfunctions.

An example of a coffee machine equipped with such a modularized apparatus for extracting coffee is disclosed in U.S. Pat. No. 4,681,028.

The coffee machine disclosed in the above U.S. patent includes a coffee supply unit for feeding coffee grinds, a water supply unit for feeding fresh water, and an apparatus adapted to prepare a coffee mixture of the coffee grinds and the water, to separate the coffee grinds from the coffee liquid, and to discharge the final coffee beverage therefrom.

The apparatus includes a hopper into which coffee grinds are poured, a movable sleeve disposed below the hopper to receive the coffee grinds, a piston disposed in the sleeve to be moved back and forth and having a plurality of holes formed thereto, a crank mechanism driven by a drive source such as a motor so as to move the movable sleeve and the piston, and an extracting head provided at its lower end with a filter element for filtering the coffee liquid, thereby allowing coffee liquid to be discharged by one revolution of the drive source.

More specifically, the coffee grinds, which are poured into the hopper, are first introduced into the sleeve and then placed on an upper end of the piston, and the movable sleeve is rotated from below the hopper to below the distributor head by means of the crank mechanism operatively connected to the drive source. Subsequently, the movable sleeve is raised toward the extracting head by a predetermined distance, and the extracting head is inserted into the movable sleeve. Thereafter, the piston is raised in the sleeve to compress the coffee grinds.

At this point, hot water is supplied to a lower portion of the movable sleeve from the water supplying unit under a certain high pressure, and the hot water is injected into the movable sleeve through the holes of the piston, to be mixed with the coffee grinds. The coffee mixture is extruded to a discharge path provided in the vicinity of the distributor head through the filter element attached to the lower end of the extracting head. Finally, the coffee liquid in the discharge path is discharged out of the apparatus.

Thereafter, as the movable cylinder is returned to its rest position by actuation of the crank mechanism, the coffee grinds remaining on the piston are removed by a lower end of the hopper.

However, in the conventional apparatus for extracting coffee, since hot water, which is to be mixed with coffee grinds, is supplied to an extracting head from a movable sleeve which is disposed at a relatively low position with respect to the extracting head, a considerable amount of coffee grinds remain on a filter element attached to the extracting head. Consequently, since fine holes of the filter element are blocked by the coffee grinds, it is not easy to smoothly discharge coffee liquid therethrough.

In addition, since a user must frequently remove coffee grinds from the filter element, it is considerably difficult to manage the coffee extracting apparatus.

SUMMARY OF THE INVENTION

Accordingly, it is an aspect of the present invention to provide a coffee extracting apparatus for use in a coffee machine, which is adapted to allow coffee liquid to be smoothly extracted and to allow coffee grinds to be easily removed.

Additional aspects and advantages of the invention will be set forth in part in the description which follows and, in part, will be obvious from the description, or may be learned by practice of the invention.

The foregoing and other aspects of the present invention are achieved by providing a coffee extracting apparatus for a coffee machine, including a cylinder unit having a cylinder, in which coffee grinds is received, an upper piston unit having a hot water path to guide hot water toward the cylinder, and a lower piston received in the cylinder unit to be moved upward and downward, and having a discharge path to discharge coffee liquid produced by mixing coffee grinds and hot water.

The coffee extracting apparatus may further include a hopper removably mounted on a case constituting a body of the coffee machine, into which coffee grinds are poured, a plurality of cam members and a plurality of link members to guide movement of the cylinder unit, the upper piston unit and the lower piston, and a drive unit fixedly mounted on the machine body to supply driving force to the plurality of cam members. The cylinder unit may be disposed below the hopper to be rotated within a certain angular range, and the upper piston unit may be disposed over the cylinder unit to be rotated, and to be raised and lowered.

The plurality of cam members may include a first cam member connected to the drive unit to be rotated, and a second cam member coaxially connected to the first cam member and rotated therewith, and the plurality of link members may include a first link members connected between the first cam member and the upper piston unit to guide movement of the upper piston unit, a second link member connected between the second cam member and the lower piston to guide movement of the lower piston, and a third link member connected between the second cam member and the cylinder unit to guide movement of the cylinder unit.

The upper piston unit may include a pair of first guide pins symmetrically formed on both sides of the upper piston unit, and a pair of second guide pins symmetrically formed on both sides of the upper piston unit to be spaced from the first guide pins by a certain distance. The case may include a pair of guide holes to guide the first guide pins of the upper piston unit, and a pair of second guide holes to guide the second guide pins of the upper piston unit. The first link member may include a first hinge portion to allow the first link member to be connected to the first cam member, and a second hinge portion fitted on one of the pair of first guide pins.

The first cam member may include a hinge protrusion at a side thereof to be fitted into the first hinge portion of the first link member, and the drive unit may include a transmission member, which is connected to the drive unit at one end thereof and engaged to the hinge protrusion of the first cam member at the other end thereof.

The second cam member may include a first guide path at one side thereof to guide movement of the second link member, and the second link member may include a third hinge portion rotatably connected to the case, a fourth hinge portion hingedly connected to the lower piston, and a first guide protrusion moved along the first guide path to move the second link member.

The lower piston may have a lower open end, through which a connecting rod is fixed to the lower piston, the connecting rod being hingedly connected to the fourth hinge portion at a lower end thereof.

The cylinder may include a lower end having an opening, the lower end being provided around the opening with an extension, which is inwardly extended to be perpendicular to the lower end.

The cylinder unit may include a third guide pin protruded therefrom by a certain length, and the case may include a third guide hole to guide the third guide pin of the cylinder unit. The second cam member may include a second guide path at one side thereof to guide movement of the third link member, and the third link member may include a fifth hinge portion hingedly connected to the case, a sixth hinge portion hingedly connected to the third guide pin of the cylinder unit, and a second guide protrusion moved along the second guide path of the second cam member to move the link member.

The hot water path may include a hot water feeding path therein.

The hot water path may include a plurality of hot water discharge paths, which allow hot water passed through the hot water feeding path to be discharged toward the cylinder unit.

The plurality of hot water discharge paths may be radially and outwardly inclined by a certain angle so as to allow the hot water to be discharged in a skirt pattern.

The upper piston unit, which faces the lower piston, may be provided at a lower end thereof with a first filter having a plurality of fine holes so as to allow coffee liquid to pass therethrough while preventing coffee grinds from passing therethrough.

The lower piston, which faces the upper piston, may be provided at an upper end thereof with a second filter having a plurality of fine holes so as to allow coffee liquid to pass therethrough while preventing coffee grinds from passing therethrough.

The discharge path may include a coffee discharge path formed on the lower piston, and a coffee discharge pipe provided at the cylinder unit to communicate with the coffee discharge trough, thereby allowing coffee liquid to be discharged to the outside.

The coffee discharge path may be defined by a trough longitudinally formed on an outer surface of the lower piston.

BRIEF DESCRIPTION OF THE DRAWINGS

These and other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
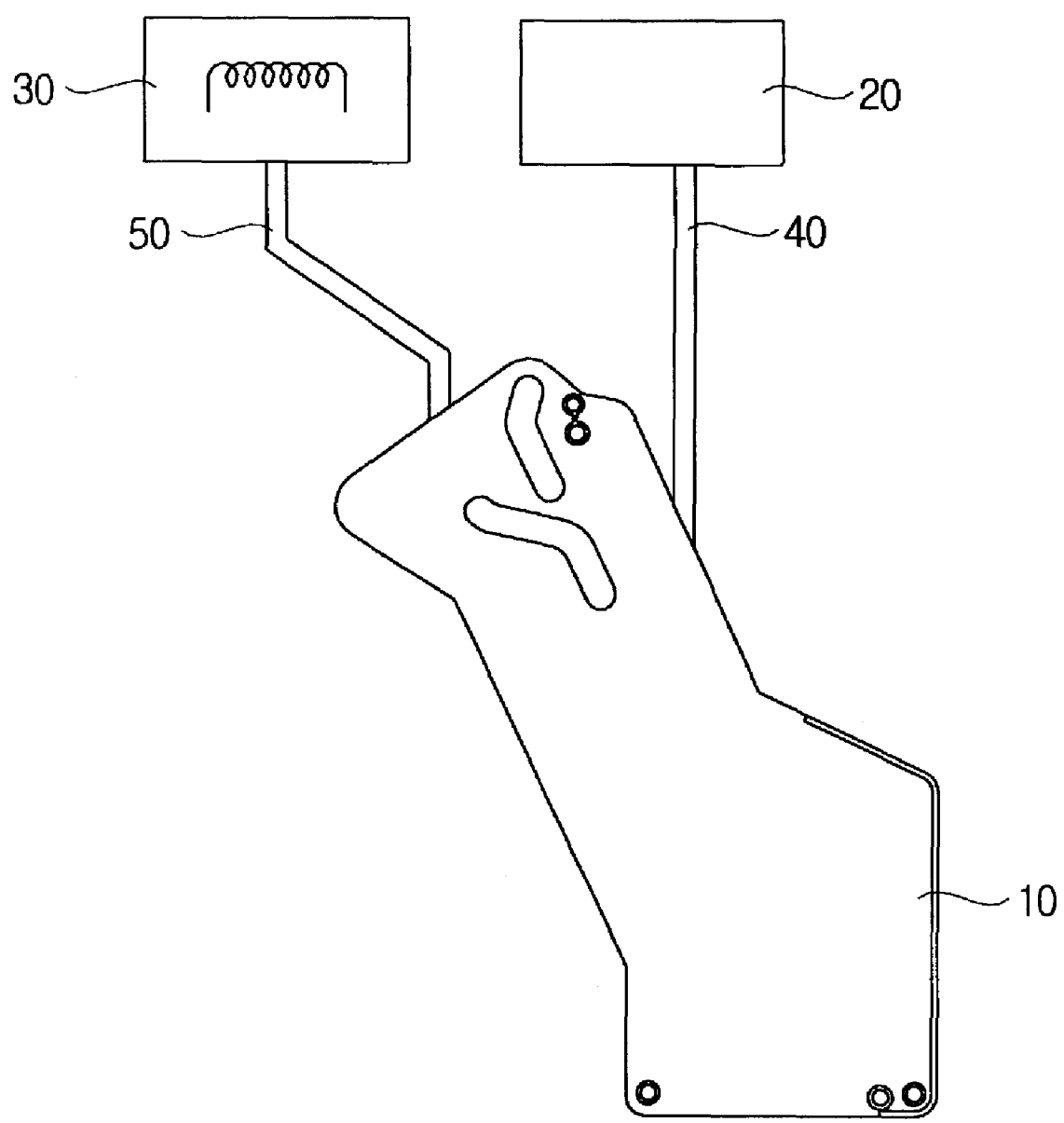
FIG. 1 is a schematic view of a coffee machine to which a coffee extracting apparatus according to the present invention is applied.

Reference will now be made in detail to the present preferred embodiment of the present invention, an example of which are illustrated in the accompanying drawings, wherein like reference numerals refer to like elements throughout.

FIG. 1 is a schematic view of a coffee machine having a coffee extracting apparatus, according to the present invention. As shown in FIG. 1, the coffee machine includes a cabinet (not shown) defining an external appearance of the coffee machine, a coffee grinds reservoir 20, hot water reservoir 30, a coffee extracting apparatus 10 adapted to mix coffee grinds supplied from the coffee grinds reservoir 20 with hot water supplied from the hot water reservoir 30, and to extract coffee liquid from the coffee mixture, a coffee grinds-feeding conduit 40 to feed coffee grinds in the coffee grinds reservoir 20 to the coffee extracting apparatus 10, and a water-feeding conduit 50 to feed hot water in the hot water reservoir 30 to the coffee extracting apparatus 10.

The hot water reservoir 30 is provided therein with a heating device to maintain the water in the reservoir 30 at a predetermined elevated temperature.

Figure 2:
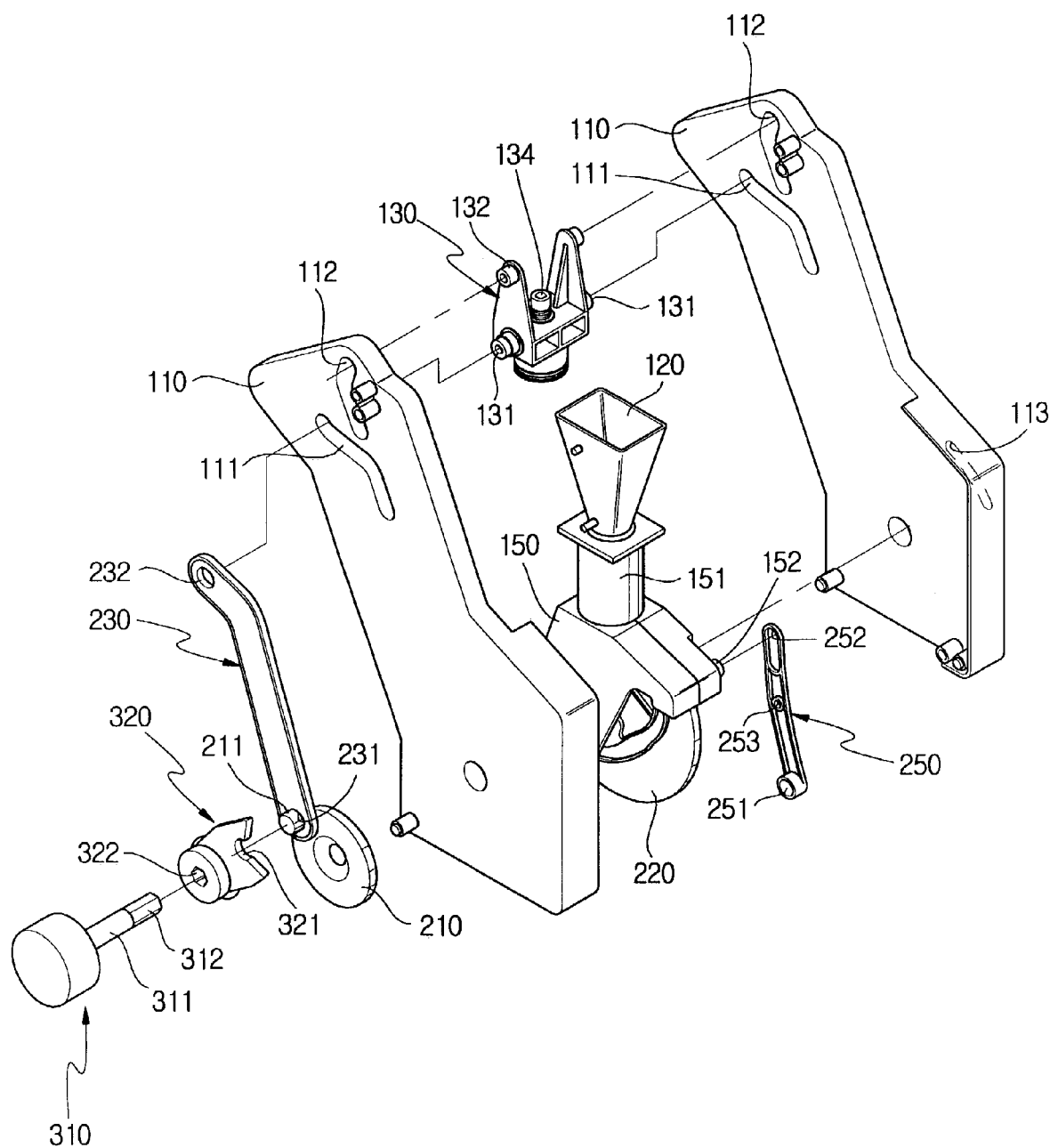
FIG. 2 is an exploded perspective view of the coffee extracting apparatus for the coffee machine according to the present invention.
Figure 3:
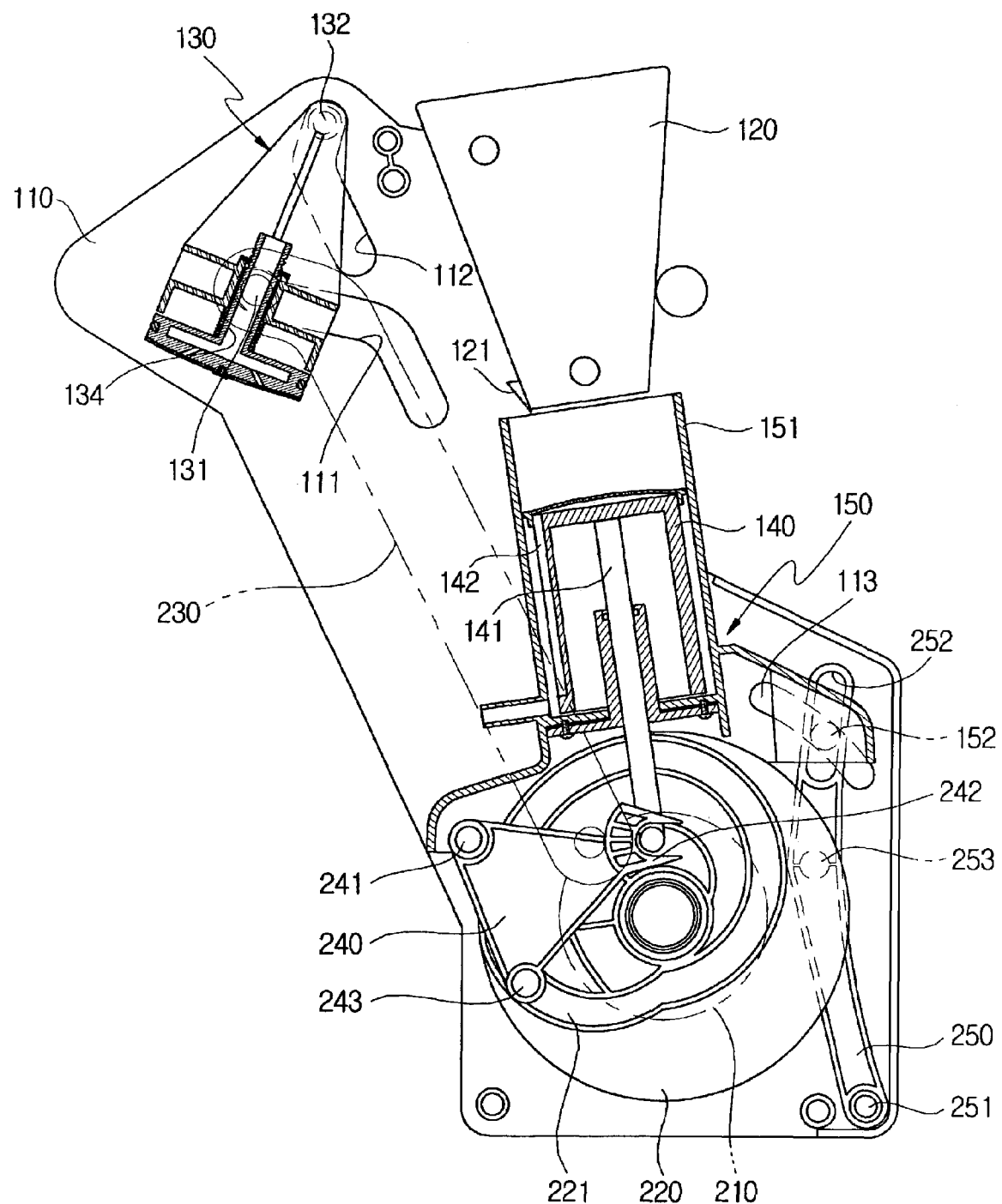
FIG. 3 is a cross-sectional view of the coffee extracting apparatus shown in FIG. 2.

With reference to FIGS. 2 and 3, a construction of the coffee extracting apparatus 10 according to the present invention is described in detail.

The coffee extracting apparatus 10 includes a case 110 defining an appearance of the apparatus 10, a hopper 120 to guide coffee grinds to the apparatus 10, a cylinder unit 150 having a cylinder 151 in which coffee grinds is received through its upper open end, an upper piston unit 130 removably inserted in the cylinder 151, a lower piston 140 disposed in the cylinder 151 to be raised and lowered, first and second cam members 210 and 220 and first, second and third link members 230, 240 and 250 to guide operations of the cylinder unit 150, the upper piston unit 130 and the lower piston 140, and a drive unit 310 to drive the first and second cam members 210 and 220.

The case 110 is comprised of a pair of case plates, each of which includes first and second guide holes 111 and 112, so that the first guide holes 111 and the second guide holes 112 are symmetrically formed at the both case plates to regulate an overall operation of the upper piston unit 130. Each of the first guide holes 111 is extended upward from a certain position by a certain length and then inclined forward. Subsequently, the first guide hole 111 is further extended forward from the curved portion by a certain length. Each of the second guide holes 112 is obliquely extended upward from a certain position above the first guide hole 111 by a certain length and then curved upward. Subsequently, the second guide hole 112 is further extended upward from the curved portion by a certain length. One case plate of the case 110 is formed with a third guide hole 113 to regulate an overall operation of the cylinder unit 150.

The hopper 120 is configured to narrow downwardly so as to efficiently guide coffee grinds, which are discharged through the coffee grinds-feeding conduit 40 (see FIG. 1), to the cylinder 151. The hopper 120 is provided at its lower end with a cleaner member 121 to remove coffee grinds after extraction of coffee liquid.

The upper piston unit 130 is provided at both its sides with a pair of first symmetrical guide pins 131, which are engaged in the first guide holes 111 and moved therealong. The upper piston unit 130 is further provided with a pair of second symmetrical guide pins 132 at both sides of an upper end thereof spaced from the first guide pins 131. The second guide pins 132 are engaged in the second guide holes 112 of the case 110 and moved therealong. Furthermore, the upper piston unit 130 is provided therein with a hot water path 134, which communicates with the water-feeding conduit 50 (see FIG. 1) to guide hot water to the cylinder 151.

The cylinder unit 150, which has the cylinder 151, is rotatably coupled to the case 110. The cylinder unit 150 is provided at a lower and rear portion thereof with a third guide pin 152, which is guided by the third guide hole 113 of the case 110 to allow the cylinder unit 150 to be rotated in a certain angular range.

The lower piston 140 is configured to have a cylindrical shape and to be opened at its lower end, so that a connecting rod 141 is fixed to an inner top surface of the lower piston 140 through the lower open end of the lower piston 140. At this point, the connecting rod 141 passes through a lower end of the cylinder 151. The connecting rod 141 is connected at its lower end to the second link member 240 (to be described later) by a hinge so as to guide an overall operation of the lower piston 140. The lower piston 140 is provided therein with a discharge path so as to allow coffee liquid resulting from mixing coffee grinds and hot water to flow therethrough.

The drive unit 310 is fixedly installed in the cabinet (not shown) of the coffee machine to provide turning force to the first and second cam members 210 and 220. The drive unit 310 includes a rotating shaft 311 and a pinion 312 provided at an end of the rotating shaft 311.

The first cam member 210 directly receives the turning force from the drive unit 310, and the second cam member 220 is positioned to be coaxial with the first cam member 210 and rotated therewith.

The first cam member 210 is made of a circular plate having a certain thickness, and is provided at its center with an annular protrusion to be rotatably fitted in a hole of the case 110. The first cam member 210 further includes a hinge protrusion 211 at an outer edge of its one side. The first cam member 210 is connected to the drive unit 310 via a transmission member 320. The transmission member 320 includes a cut portion 321 to which the rotating protrusion 211 of the first cam member 210 is engaged, and a fitting hole 322 with which the pinion 312 of the drive unit 310 is engaged.

The second cam member 220 is centrally provided at both its sides with protruded shafts, which are rotatably fitted in holes of the case 110. The second cam member 220 includes a first guide path 221 at its one side to guide movement of the second link member 240 (to be described later).

Among the link members 230, 240 and 250, the first link member 230 serves to guide an operation of the upper piston unit 130, the second link member 240 serves to guide an operation of the lower piston 140, and the third link member 250 serves to guide an operation of the cylinder unit 150.

The first link member 230 is formed at its lower end with a first hinge portion 231 into which the rotating protrusion 211 of the first cam member 210 is fitted, and is formed at its upper end with a second hinge portion 232 into which one of the first guide pins 131 of the upper piston unit 130 is fitted.

The second link member 240 is configured to have a triangular plate, which is provided at its three vertex portions with a third hinge portion 241 hingedly connected to the case 110, a fourth hinge portion 242 hingedly connected to a lower end of the connecting rod 141 of the lower piston 140, and a first guide protrusion 243. The first guide protrusion 243 is guided along the first guide path 221 of the second cam member 220.

Figure 4:
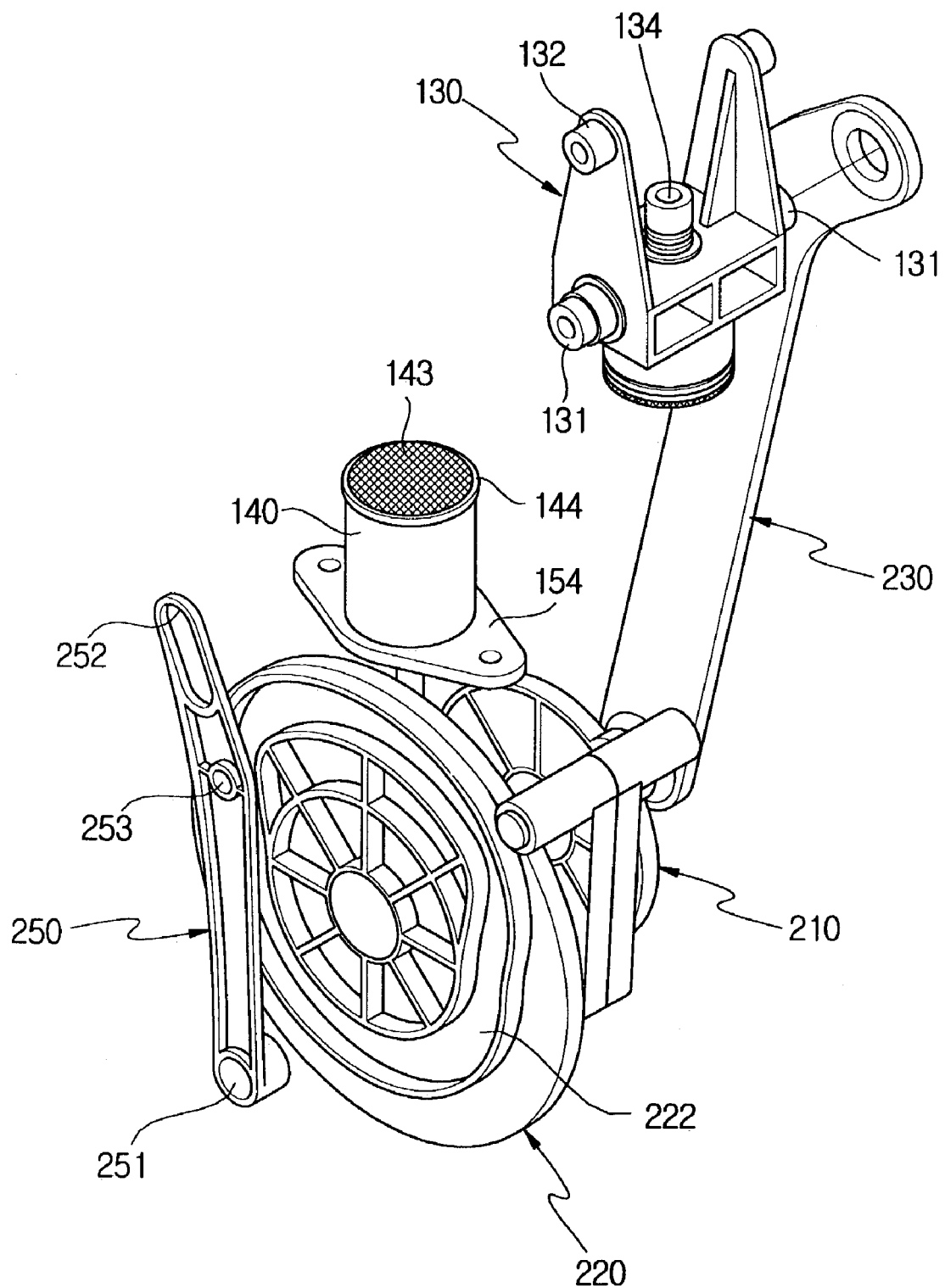
FIG. 4 is a perspective view showing components of the coffee extracting apparatus shown in FIG. 2.

As shown in FIGS. 3 and 4, the third link member 250 is provided at both its ends with a fifth hinge portion 251 hingedly connected to the case 110, and a sixth hinge portion 252 hingedly fitted on the third guide pin 152 of the cylinder unit 150. A second guide protrusion 253 is provided at a midsection between the fifth hinge portion 251 and the sixth hinge portion 252 of the third link member 250. The second guide protrusion 253 is guided by and along the second guide path 222 provided at an outer side of the second cam member 220.

Figure 5:
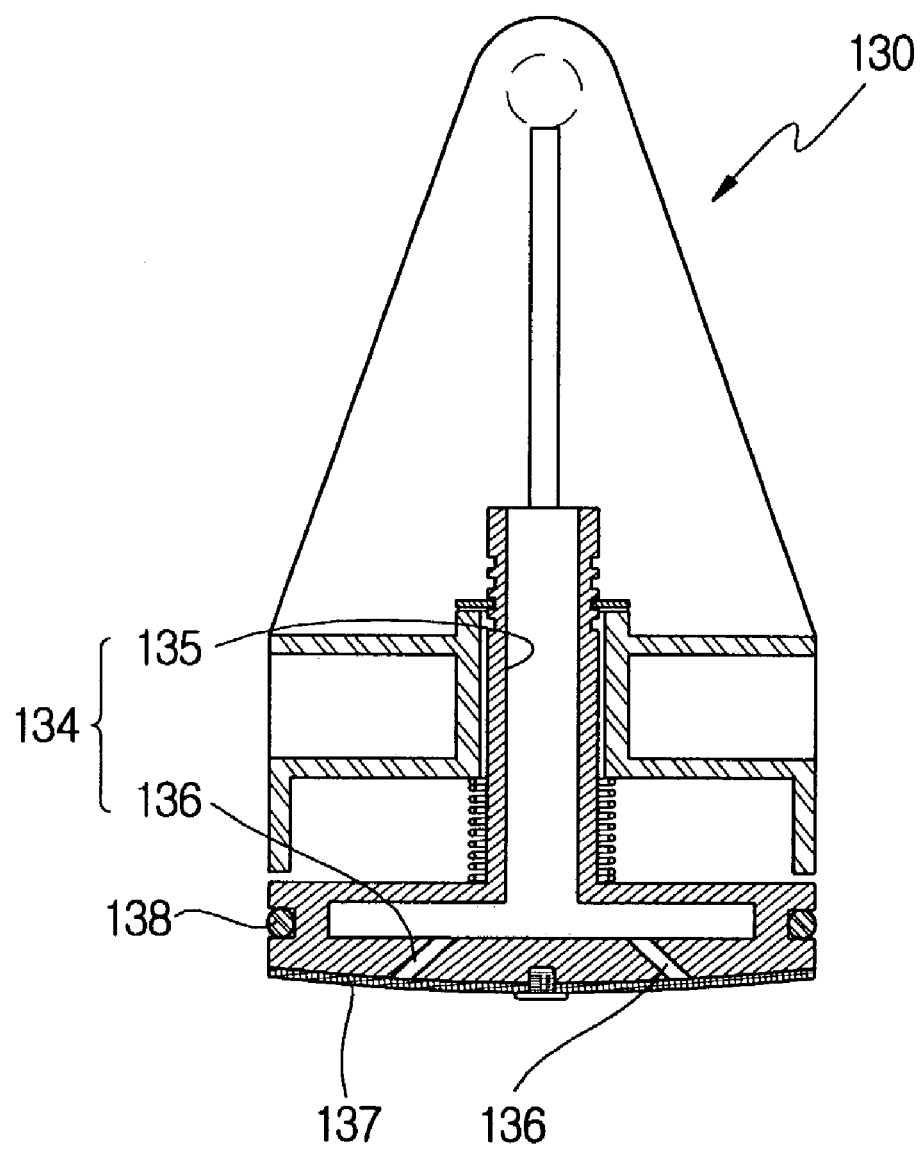
FIG. 5 is a cross-sectional view of an upper piston unit of the coffee extracting apparatus shown in FIG. 2.

FIG. 5 shows an internal structure of the upper piston unit 130. As shown in FIG. 5, the upper piston unit 130 includes a hot water path 134 therein. The hot water path 134 comprises a hot water feeding path 135, which allows hot water to be introduced into the upper piston unit 130, and a plurality of hot water discharge paths 136. The hot water feeding path 135 allows hot water to be introduced into the upper piston unit 130, and the hot water discharge paths 136 discharge the introduced hot water from the upper piston unit 130.

The hot water feeding path 135 is enlarged in its diameter at its lower end, to which the plurality of hot water discharge paths 136 are connected. The plurality of hot water discharge paths 136 are configured to discharge hot water toward the cylinder 151. More specifically, the plurality of hot water discharge paths 136 are radially and outwardly inclined by a certain angle so as to discharge the hot water in a skirt pattern.

The upper piston unit 130 is provided at its end with a first filter 137 having a plurality of fine holes such that the hot water discharge paths 136 are covered with the first filter 137. The first filter 137 allows hot water to pass therethrough but prevent coffee grinds from being introduced into the upper piston unit 130.

The upper piston unit 130 is provided at an outer surface of its lower end with an annular groove, in which a sealing member 138 is fitted. By this configuration of the upper piston unit 130, hot water, which has been introduced into the upper piston unit 130 through the hot water feeding path 135, flows in the hot water discharge paths 136 and is then discharged through the first filter 137.

Figure 6:
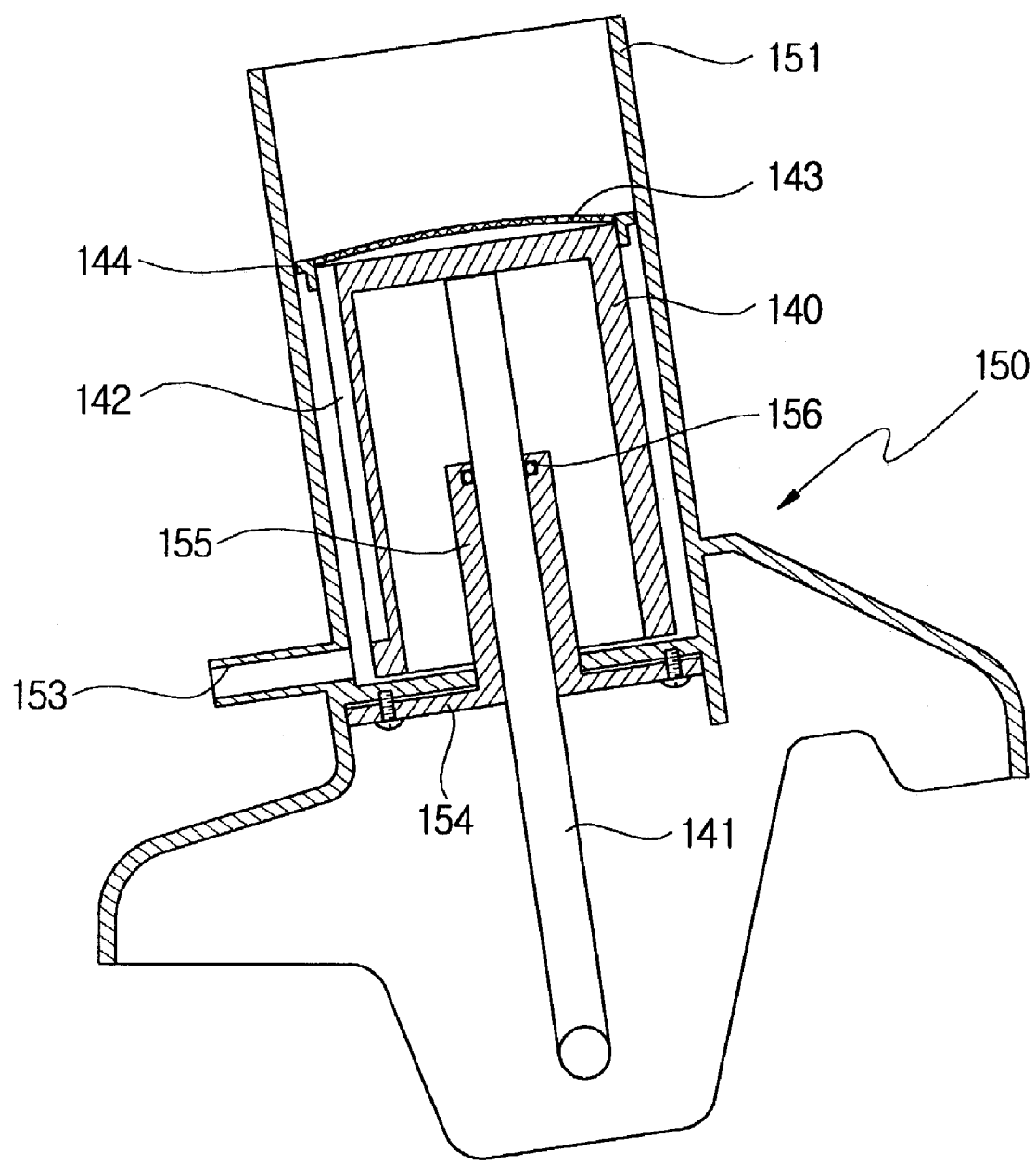
FIG. 6 is a cross-sectional view of a lower piston of the coffee extracting apparatus shown in FIG. 2.

FIG. 6 shows an internal structure of the lower piston 140. As shown in FIG. 6, coffee liquid is produced by mixing coffee grinds and hot water in a space above the lower piston 140. The lower piston 140 is provided at its upper end with a second filter 143 having a plurality of fine holes, which allows pure coffee liquid to pass therethrough while catching coffee grinds. The lower piston 140 is provided at an outer surface of its upper end with a sealing member 144, which is to be close contact with an inner surface of the cylinder 151.

The pure coffee liquid, which has passed through the second filter 143, flows along the coffee discharge trough 142. The coffee discharge trough 142 is achieved by forming a longitudinal groove from an upper end of the lower piston 140 to a region close to a lower end of the lower piston 140.

The coffee discharge trough 142 constitutes a discharge part together with a coffee discharge pipe 153 provided at a lower portion of the cylinder unit 150. Coffee liquid flowing in the coffee discharge trough 142 is discharged through the coffee discharge pipe 153.

The cylinder unit 150 is provided at its lower end with a rod guide member 154 so as to prevent the connecting rod 141 from shaking. The rod guide member 154 includes a central extension 155 to more stably guide the connecting rod 141. The central extension 155 is provided at an inner surface of its upper end with an annular groove having a sealing member 156 fitted therein. Therefore, the sealing member 156 is interposed between an outer surface of the connecting rod 141 and an inner surface of the central extension 155 to maintain an airtight condition therebetween.

The operation of functions of the coffee extracting apparatus 10 according to the present invention will now be described.

FIG. 3 shows the coffee extracting apparatus 10 according to the present invention, which is in its initial operational condition. In this condition, coffee grinds is poured into the hopper 120, and is disposed on an upper surface of the lower piston 140 inserted in the cylinder 151.

Figure 7:
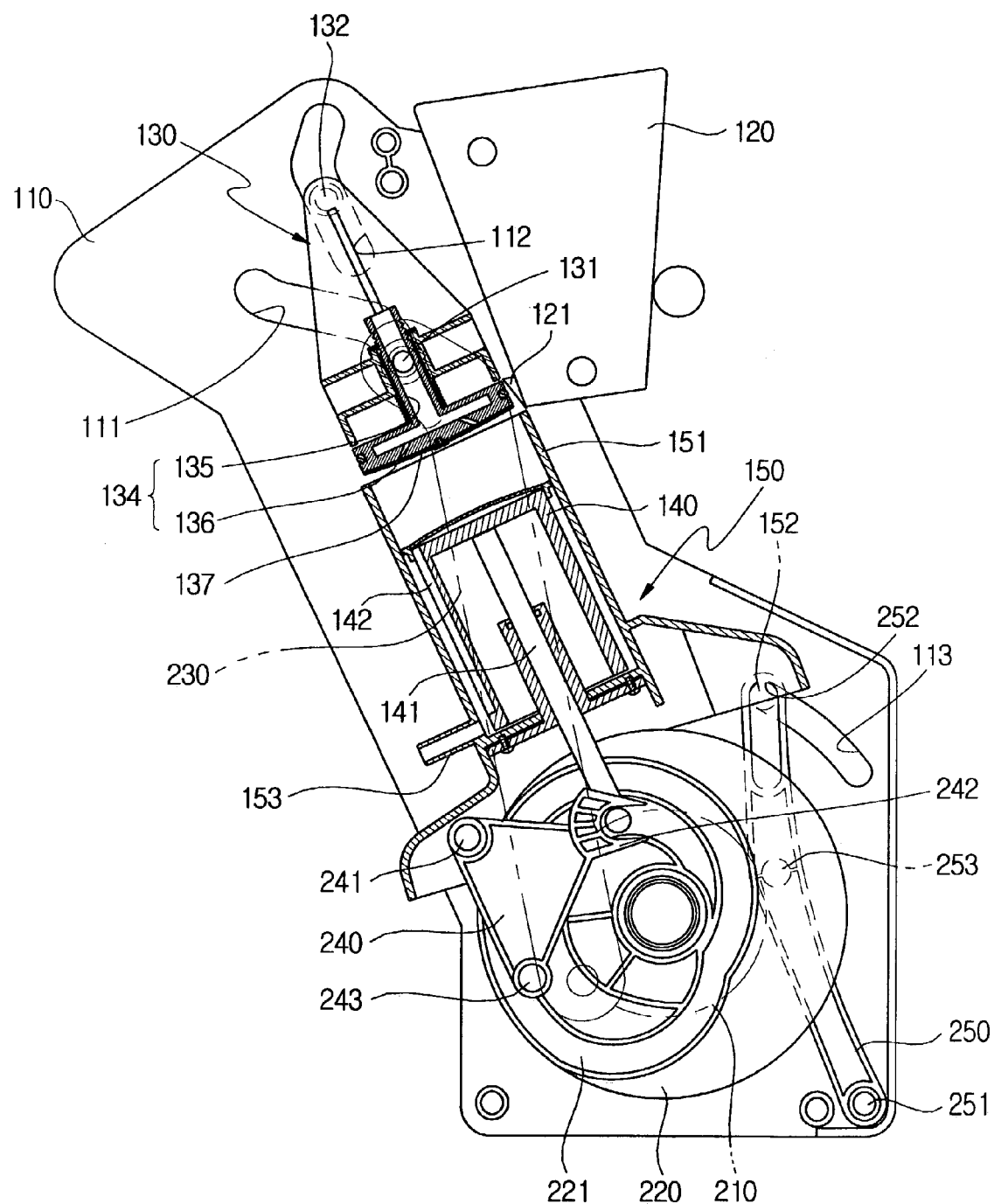
FIG. 7 is a cross-sectional view of the coffee extracting apparatus shown in FIG. 2, in which a cylinder unit of the coffee extracting apparatus is rotated forwardly.

As shown in FIG. 7, when the first cam member 210 is rotated counterclockwise by about 60°, the first link member 230 hingedly connected to the first cam member 210 is rotated coincidentally. At this point, the upper piston unit 130, which is hingedly connected to the first link member 230, is lowered by a certain distance while being moved rearward by guidance of the first and second guide holes 111 and 112.

At the same time, the second cam member 220 is also rotated counterclockwise by about 60°, thereby causing the third link member 250, guided by the second guide path 222 (see FIG. 4) of the second cam member 220, to be rotated forwardly. Consequently, the cylinder member 150 hingedly connected to the third link member 250 is rotated forwardly by a certain angle by guidance of the third guide hole 113 of the case 110. As a result, the upper piston unit 130 faces the cylinder 151, so that the two components are aligned with each other.

Figure 8:
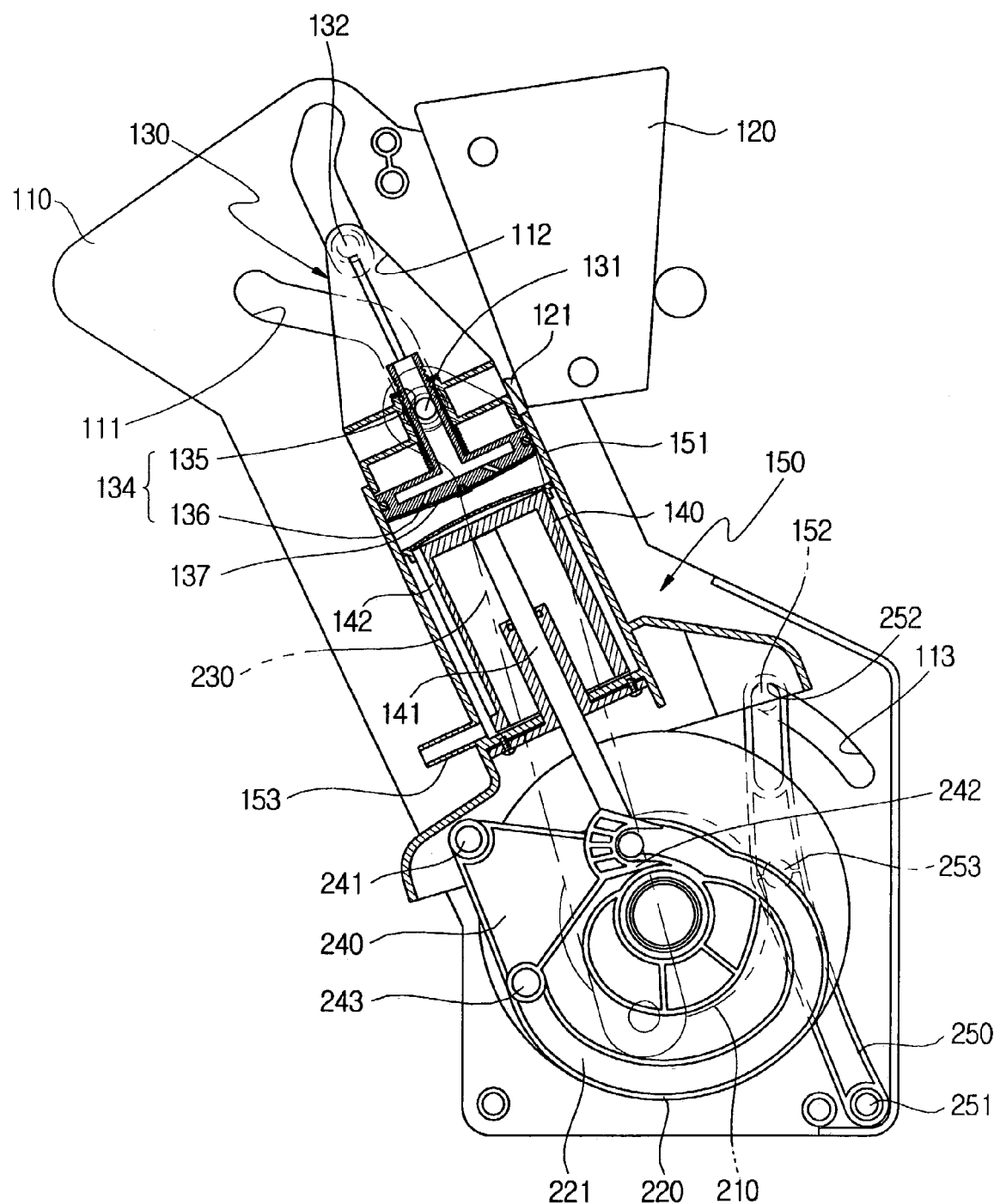
FIG. 8 is a cross-sectional view of the coffee extracting apparatus shown in FIG. 2, in which the upper piston unit is lowered to press coffee grinds on the lower piston.

As shown in FIG. 8, when the first cam member 210 is further rotated counterclockwise by an angle of 100°, the upper piston unit 130, which is hingedly connected to the first link member 230, is lowered by a certain distance and then inserted into the cylinder 151, by rotation of the first link member 230 hingedly connected to the first cam member 210. Accordingly, the upper piston unit 130 presses the coffee grinds disposed on the top surface of the lower piston 140 while discharging hot water to be mixed with the coffee grinds, thereby causing the resulting coffee liquid to be discharged to the outside through the coffee discharge trough 142 of the lower piston 140 and the coffee discharge pipe 153.

Figure 9:
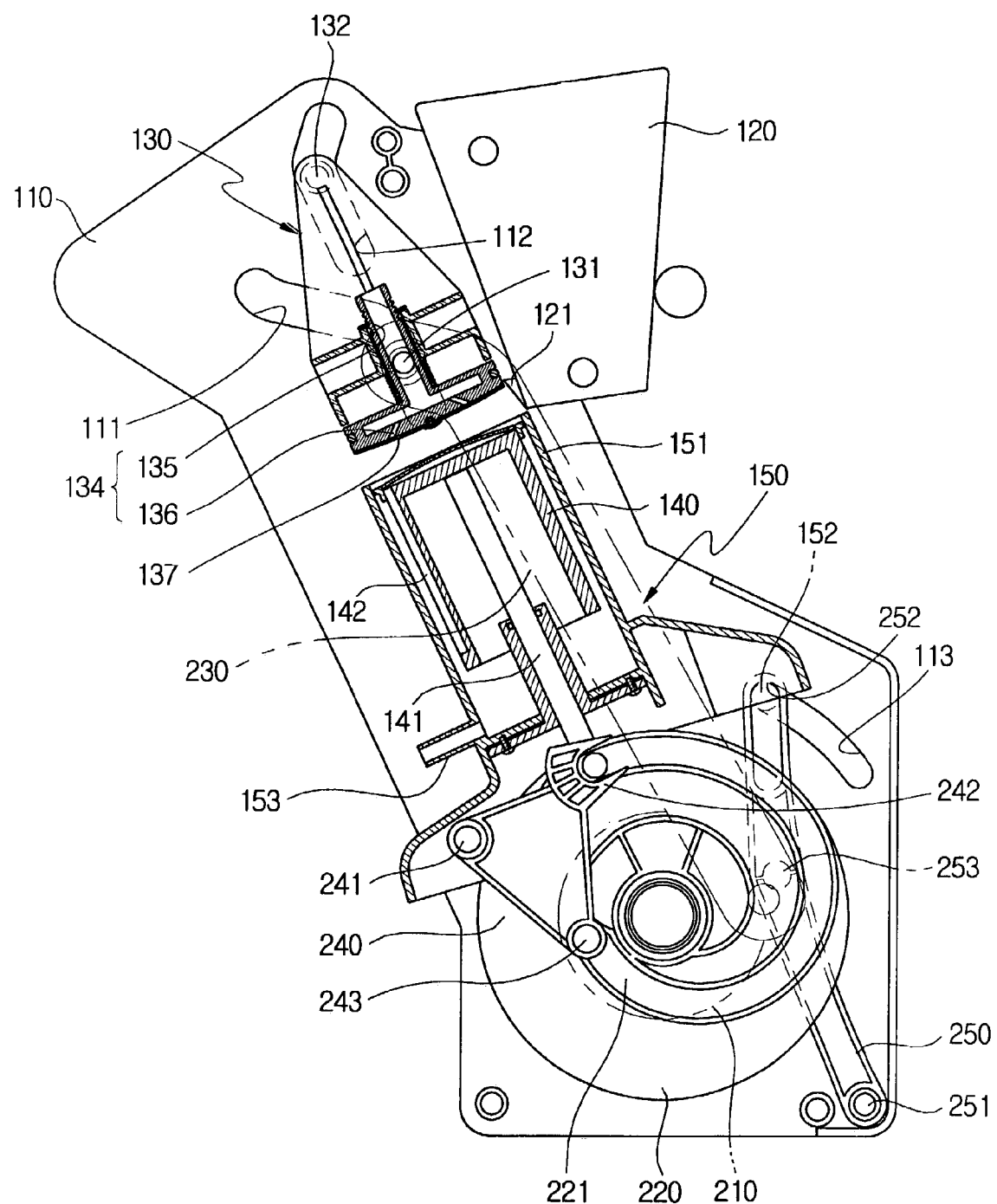
FIG. 9 is a cross-sectional view of the coffee extracting apparatus shown in FIG. 2, in which the lower piston is raised.

As shown in FIG. 9, when the first cam member 210 is further rotated counterclockwise by an angle of 100°, the upper piston unit 130, which is hingedly connected to the first link member 230, is rotated by a certain angle while being raised, by rotation of the second link member 220.

At the same time, the second cam member 220 is also further rotated counterclockwise by an angle of 100°. This further rotation of the second cam member 220 causes the second link member 240, which is guided by the first guide path 221 of the second cam member 220, to be raised, thereby causing the lower piston 140 hingedly connected to the second link member 240 to be raised.

Figure 10:
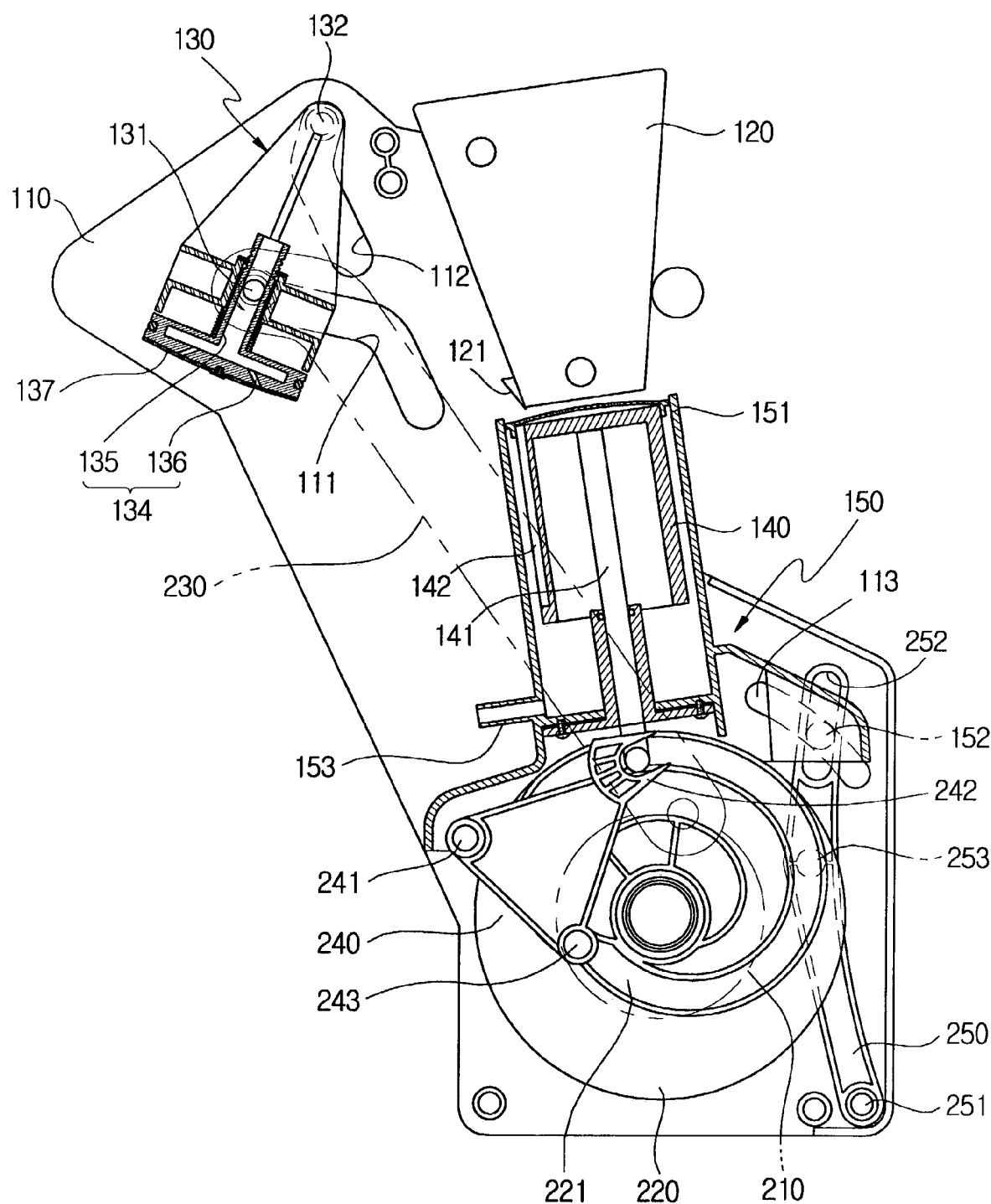
FIG. 10 is a cross-sectional view of the coffee extracting apparatus shown in FIG. 2, in which a cylinder unit of the coffee extracting apparatus is rotated rearwardly.

As shown in FIG. 10, when the first cam member 210 is further rotated counterclockwise by an angle of 20°, the second cam member 220 is also rotated counterclockwise by an angle of 20°. By the rotation of the second cam member 220, the third link member 250, which is guided along the second guide path 222 (see FIG. 4) of the second cam member 220, is rotated rearwardly, thereby causing the cylinder unit 150 hingedly connected to the third link member 250 to be rotated rearwardly.

At this point, since the lower piston 140 is disposed at its most raised position, as the cylinder unit 150 is rotated counterclockwise, coffee grinds remaining on the top surface of the lower piston 140 are removed by the cleaner member 121 mounted on a lower end of the hopper 120.

Subsequently, when the first cam member 210 is further rotated counterclockwise by an angle of 80°, the second cam member 220 is also rotated counterclockwise by the same angle. By this rotation, the second link member 240 is lowered by guidance of the first guide path 221 of the second cam member 220, and thus the lower piston 140 hingedly connected to the second link member 240 is lowered to its initial position as shown in FIG. 3. Therefore, every time the first cam member 210 is rotated counterclockwise by an angle of 360°, the coffee extracting apparatus 10 extracts a unit amount of coffee liquid.

As apparent from the above description, the present invention provides a coffee extracting apparatus for a coffee machine, which is adapted to extract a unit amount of coffee liquid with every one revolution of a drive unit. According to the present invention, since the coffee extracting apparatus is modularized to be removably installed in a coffee machine, cleaning and repairing operations are made considerably easier.

In addition, since the coffee extracting apparatus according to the present invention is designed to allow hot water to be downwardly supplied from an upper piston to a lower piston, adhesion of coffee grinds to a bottom surface of the upper piston can be avoided. Coffee grinds remaining on the top surface of the lower piston can be removed by a cleaner member provided at a hopper. As a result, since such coffee grinds, which are commonly left over from the coffee extraction operation, can be easily removed, and extraction of coffee liquid is efficiently achieved, thereby making additional cleaning operation of facing surfaces of the upper and lower pistons unnecessary.

Although a preferred embodiment of the present invention has been shown and described, it would be appreciated by those skilled in the art that changes may be made in these embodiments without departing from the principles and spirit of the invention, the scope of which is defined in the claims and their equivalents.

What is claimed is:

1. A coffee extracting apparatus for a coffee machine, comprising:
   a case,
   a cylinder unit having a cylinder, in which coffee grinds are received;
   an upper piston unit having a hot water path to guide hot water toward the cylinder; a pair of first guide pins symmetrically formed on both sides of the upper piston unit and a pair of second guide pins symmetrically formed on both sides of the upper piston unit to be spaced from the first guide pins by a certain distance; and
   a lower piston received in the cylinder unit to be moved upward and downward, and having a discharge path to discharge coffee liquid produced by mixing coffee grinds and hot water, and
   wherein the case includes a pair of first guide holes to guide the first guide pins of the upper piston unit, and a pair of second guide holes to guide the second guide pins of the upper piston.

2. The coffee extracting apparatus as set forth in claim 1, further comprising:
   a hopper removably mounted on a case constituting a body of the coffee machine, into which coffee grinds are poured;
   a plurality of cam members and a plurality of link members to guide movement of the cylinder unit, the upper piston unit and the lower piston; and
   a drive unit fixedly mounted on the machine body to supply driving force to the plurality of cam members;
   wherein the cylinder unit is disposed below the hopper to be rotated within a certain angular range,
   wherein the upper piston unit is disposed over the cylinder unit to be rotated, and to be raised and lowered.

3. The coffee extracting apparatus as set forth in claim 2, wherein the plurality of cam members include a first cam member connected to the drive unit to be rotated, and a second cam member coaxially connected to the first cam member and rotated therewith, and wherein the plurality of link members include a first link members connected s between the first cam member and the upper piston unit to guide movement of the upper piston unit, a second link member connected between the second cam member and the lower piston to guide movement of the lower piston, and a third link member connected between the second cam member and the cylinder unit to guide movement of the cylinder unit.

4. The coffee extracting apparatus as set forth in claim 3,
   wherein the first link member includes a first hinge portion to allow the first link member to be connected to the first cam member, and a second hinge portion fitted on 20 one of the pair of first guide pins.

5. The coffee extracting apparatus as set forth in claim 4, wherein the first cam member includes a hinge protrusion at a side thereof to be fitted into the first hinge portion of the first link member, and
   wherein the drive unit includes a transmission member, which is connected to the drive unit at one end thereof and engaged to the hinge protrusion of the first cam member at the other end thereof.

6. The coffee extracting apparatus as set forth in claim 3, wherein the second s cam member includes a first guide path at one side thereof to guide movement of the second link member, and
   wherein the second link member includes a third hinge portion rotatably connected to the case, a fourth hinge portion hingedly connected to the lower piston, and a first guide protrusion moved along the first guide path to move the second link to member.

7. The coffee extracting apparatus as set forth in claim 6, wherein the lower piston has a lower open end, through which a connecting rod is fixed to the lower piston, the connecting rod being hingedly connected to the fourth hinge portion at a lower end is thereof.

8. The coffee extracting apparatus as set forth in claim 7, wherein the cylinder includes a lower end having an opening, the lower end being provided around the opening with an extension, which is extended to be perpendicular to the lower end.

9. The coffee extracting apparatus as set forth in claim 3, wherein the cylinder unit includes a third guide pin protruded therefrom by a certain length, and the case includes a third guide hole to guide the third guide pin of the cylinder unit,
   wherein the second cam member includes a second guide path at one side thereof to guide movement of the third link member, and
   wherein the third link member includes a fifth hinge portion hingedly connected to the case, a sixth hinge portion hingedly connected to the third guide pin of the cylinder unit, and a second guide protrusion moved along the second guide path of the second cam member to move the link member.

10. The coffee extracting apparatus as set forth in claim 2, wherein the hot water path includes a hot water feeding path therein.

11. The coffee extracting apparatus as set firth in claim 11, wherein the hot water path includes a plurality of hot water discharge paths, which allow hot water passed through the hot water feeding path to be discharged toward the cylinder unit.

12. The coffee extracting apparatus as set forth in claim 11, wherein the plurality of hot water discharge paths are radially and outwardly inclined by a certain angle so as is to allow the hot water to be discharged in a skirt pattern.

13. The coffee extracting apparatus as set forth in claim 2, wherein a lower end of the upper piston unit, which faces the lower piston, is provided with a first filter having a plurality of fine holes so as to allow coffee liquid to pass therethrough while preventing 20 coffee grinds from passing therethrough.

14. The coffee extracting apparatus as set forth in claim 2, wherein an upper end of the lower piston, which faces the upper piston, is provided with a second filter having a plurality of fine holes so as to allow coffee liquid to pass therethrough while allowing 2s coffee grinds to be caught thereby.

15. The coffee extracting apparatus as set forth in claim 2, wherein the discharge path includes a coffee discharge path formed on the lower piston, and a coffee discharge j pipe provided at the cylinder unit to communicate with the coffee discharge trough, s thereby allowing coffee liquid to be discharged to the outside.

16. The coffee extracting apparatus as set forth in claim 2, wherein the coffee discharge path is defined by a trough longitudinally formed on an outer surface of the lower piston.

* * * * *